(12) United States Patent
Lundevall et al.

(10) Patent No.: US 8,995,282 B2
(45) Date of Patent: Mar. 31, 2015

(54) FAST CHANNEL PROBING

(75) Inventors: Magnus Lundevall, Sollentuna (SE); Jessica Ostergaard, Stockholm (SE); Yu Qian, Beijing (CN); Henning Wiemann, Aachen (DE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 196 days.

(21) Appl. No.: 13/582,869

(22) PCT Filed: Mar. 11, 2010

(86) PCT No.: PCT/SE2010/050273
§ 371 (c)(1),
(2), (4) Date: Sep. 5, 2012

(87) PCT Pub. No.: WO2011/112127
PCT Pub. Date: Sep. 15, 2011

(65) Prior Publication Data
US 2013/0003560 A1    Jan. 3, 2013

(51) Int. Cl.
*G01R 31/08*  (2006.01)
*H04W 24/00*  (2009.01)
*H04L 1/18*  (2006.01)
*H04L 1/20*  (2006.01)
*H04L 1/24*  (2006.01)
*H04L 12/24*  (2006.01)
*H04W 28/18*  (2009.01)
*H04W 48/08*  (2009.01)
*H04W 48/16*  (2009.01)
*H04L 1/00*  (2006.01)

(52) U.S. Cl.
CPC ........... *H04W 24/00* (2013.01); *H04L 41/5019* (2013.01); *H04W 28/18* (2013.01); *H04W 48/08* (2013.01); *H04W 48/16* (2013.01); *H04L 1/0003* (2013.01); *H04L 1/0009* (2013.01); *H04L 1/1867* (2013.01); *H04L 1/201* (2013.01); *H04L 1/245* (2013.01)
USPC ............ 370/241; 370/254; 370/282; 370/276

(58) Field of Classification Search
None
See application file for complete search history.

(56) References Cited

U.S. PATENT DOCUMENTS

2004/0017860 A1* 1/2004 Liu ................................ 375/299
2005/0143125 A1   6/2005 Maltsev et al.
2005/0249162 A1* 11/2005 Kim et al. ..................... 370/333

(Continued)

FOREIGN PATENT DOCUMENTS

EP        2187679 A1    5/2010
WO    2009044686 A1    4/2009

*Primary Examiner* — Anez Ebrahim
(74) *Attorney, Agent, or Firm* — Coats & Bennett, PLLC (57) ABSTRACT

A method and arrangement for estimating the current channel quality for a data transfer in a mobile network. In a sending system entity, a channel quality estimate (CQE) associated with a data transfer to a receiving system entity in a mobile communication network is adjusted. One or more probing packets are communicated 400 between the sending system entity and the receiving system entity, each probing packet being formatted according to a predefined combination of transmission parameters. Furthermore, is a Channel State Information (CSI) report received 404 from the receiving system entity, and the CQE is adjusted 406 based on the CSI report and which probing packets have been successfully communicated. By sending a sequence of probing packets, each formatted according to a predefined combination of transmission parameters, and not waiting for each packet to be acknowledged, a fast and accurate estimation of the current channel quality is achieved.

13 Claims, 7 Drawing Sheets

(56) References Cited

U.S. PATENT DOCUMENTS

| | | | |
|---|---|---|---|
| 2006/0002338 A1* | 1/2006 | Guo | 370/328 |
| 2008/0267133 A1 | 10/2008 | Shida et al. | |
| 2010/0104038 A1 | 4/2010 | Stager et al. | |
| 2011/0149732 A1* | 6/2011 | Uzunalioglu et al. | 370/235 |

* cited by examiner

FAST CHANNEL PROBING

TECHNICAL FIELD

The present invention relates generally to a method and apparatus for optimising wireless transmissions in a telecommunication system by means of more accurate link quality estimation.

BACKGROUND

In 3GPP (3$^{rd}$ Generation Partnership Project), the packet-switched communication systems HSPA (High Speed Packet Access) and LTE (Long Term Evolution) have been specified for wireless transmission of data packets between user terminals and base stations in a cellular/mobile network. In this description, the term "base station" is used to generally represent any system entity capable of wireless communication with a user terminal.

LTE systems generally use OFDM (Orthogonal Frequency Division Multiplexing) involving multiple narrowband subcarriers which are further divided into time slots to form a so-called "time-frequency grid" where each frequency/timeslot combination is referred to as a "Resource Element RE". In LTE, multiple antennas can also be employed in both user terminals and base stations for obtaining parallel and spatially multiplexed data streams, e.g. according to MIMO (Multiple Input Multiple Output), which is well-known in the art. Other wireless communication systems relevant for the following description include but is not limited to WCDMA (Wideband Code Division Multiple Access), WiMAX, UMB (Ultra Mobile Broadband), GPRS (General Packet Radio Service) and GSM (Global System for Mobile communications).

A base station of a cell in a wireless network may transmit data and control information in a physical downlink channel to a user terminal or "UE" (User Equipment), and a user terminal may likewise transmit data and control information in a physical uplink channel in the opposite direction to the base station. In this description, a physical downlink or uplink channel is generally referred to as a wireless link between a sending entity and a receiving entity. Further, the terms "sending entity" and "receiving entity" are used here merely to imply the direction of the wireless link considered, although these entities can of course both receive and send data and messages in an ongoing communication. Further, the term "Resource Element RE" is used in this description to generally represent a signal bearer element that can carry a signal over a wireless link, without limitation to any transmission technology such as LTE. For example, an RE can incorporate a specific code and timeslot in a system using CDMA (Code Division Multiple Access), or a specific frequency and timeslot in a system using TDMA (Time Division Multiple Access), and so forth.

When two entities in a cell communicate over a wireless link that is configured according to various link parameters, one or more such link parameters can be adapted to the current state of the link on a dynamic basis, often referred to as link adaptation. Such link parameters may include transmission power, transmit antenna weights, modulation schemes, encoding schemes, and the number of parallel data streams when multiple antennas are used, the latter link parameter being called "transmission rank". Link adaptation is used to generally optimise transmission in order to increase capacity and data throughput in the network. Further, link adaptation can be employed for the uplink and the downlink independently, if applicable, since the current state of the uplink and downlink can be very different, e.g. due to different interference and when frequency and/or time are widely separated for uplink and downlink transmissions between the two entities.

To support link adaptation during an ongoing communication between a sending entity and a receiving entity, either on the uplink or downlink, the receiving entity is often required to measure certain link parameters and report recommended link parameters to the sending entity, such as a recommended transmission rank and/or a recommended precoder matrix and channel quality indicators (CQI). The quality of the received signal is often measured, typically in terms of a Signal to Interference and Noise Ratio SINR, e.g. separately for different parallel data streams. Based on the measured SINR value(s), the receiving entity estimates so-called "Channel Quality Indicators" CQIs, e.g. one CQI for each coded data block (codeword). The CQIs, which may be expressed in terms of a recommended modulation and coding scheme, are used together with the other link parameters to indicate the current state of the link. In this description, the recommended link parameters, including CQI and/or transmission rank and/or a precoder matrix, will be called a "link state report" for short. The sending entity can then adapt one or more link parameters depending on the received link state report. The reported CQIs may also be used for packet scheduling decisions.

Typically, specific known reference symbols RS, or equivalently pilot symbols, are regularly transmitted over a wireless link according to a predetermined scheme to support the above link quality estimation. In an OFDM-based LTE system, these RSs are transmitted from base stations in predetermined REs in the time-frequency grid as known by the receiving terminal.

In general, a received signal "r" in an RE is basically comprised of transmitted symbols "s" as well as noise and interference "n". Thus:

$$r = Hs + n \qquad (1)$$

Generally, r, s and n are vectors and H is a matrix, where "H" represents the channel response which can be derived from a channel estimator in the receiver. However, the noise and interference of a signal in an RE may display different characteristics because the interference mix hitting the REs may typically have different transmission power and spatial characteristics, e.g. due to time and/or frequency synchronization in neighbouring cells. The interference is a mix of interference from REs containing payload data, REs containing control signalling and REs containing RSs, where each component can vary in size from non-existent to being the only component in the mix. The interference/noise "I" in these different signal types may be characterised in terms of second order statistics that can be obtained by frequently measuring the signals over time, although "I" can be characterised in other ways as well.

If an RE contains an RS signal received by a user terminal, the terminal is able to estimate the interference/noise n=I(RS) of the RS signal since s are known symbols in this case and H is given by the channel estimator. If the RE contains data scheduled for the terminal, the interference and noise n=I (data) can also be estimated once the data symbols have been detected (i.e. decoded) by the terminal, s thereby being known at that point. In order to obtain proper link quality estimation and to determine an accurate CQI and/or link parameter recommendation for a link, the receiving entity needs sufficient statistics from measuring signals transmitted on the link. Furthermore, the characteristics of intercell interference may be significantly different depending on what signal type is causing the interference from neighbouring cells, i.e. RS signals or data signals. If payload data is transmitted over the link to be estimated, the receiving entity should preferably measure the interference I(data) that hits the data signals. However, the measurements would then be limited to REs that contain data scheduled for the user terminal involved, which may be too scarce such that the statistic basis for determining the CQI is insufficient. Moreover, the data symbols must be detected and decoded, and possibly also re-encoded, before the interference I(data) can be properly estimated, which may impose substantial costs and/or unacceptable delays due to the data processing.

Alternatively or additionally, the receiving entity can measure the interference I(RS) for REs containing an RS which may occur more frequently than the REs containing scheduled data. Measuring I(RS) is also generally more reliable since the RS is always known to the receiving entity. However, the interference that hits RS signals may be significantly different from that hitting the data signals, e.g. with respect to statistics. Therefore, a CQI and/or link parameter recommendation determined from I(RS) measurements may not be representative for a link with payload data transmission. As a result, the link adaptation at the sending entity may not be optimal for data due to either too optimistic or too pessimistic CQI and/or link parameter recommendation from the receiving entity. Hence, if the measured I(RS) is significantly greater than the actual I(data), the CQI and/or link parameter recommendation will be based on an overestimated interference (or underestimated SINR) and therefore unduly pessimistic, and vice versa.

For example, when MIMO is employed in an LTE system and enabled by cell-specific RSs, each antenna must have its own RSs and the REs holding an RS of one antenna at the sending entity must be empty for all other antennas in the same cell, which substantially limits the number of REs available for RS transmissions. As a result, the interference that hits REs containing an RS will largely come from RS transmissions in other cells due to reuse of the RS transmission pattern. As mentioned above, RSs are always transmitted from base stations according to a predetermined scheme and at a relatively high fixed power in order to be received by any terminal in the cell, whereas payload data is only transmitted when scheduled for a specific terminal. Thus, in a situation with low data traffic and/or low transmission power for data signals, I(data) is generally lower than I(RS).

Hence, it is often difficult to obtain accurate estimates of the intercell interference that hits data transmissions, in particular if the interference measurements are performed on RS transmissions, as explained above. Inaccurate estimates of the SINR may thus result in misleading CQIs and non-optimal link parameter recommendations such as transmission rank. A consequence for MIMO systems is that an underestimated SINR may result in a too pessimistic transmission rank when the used link can actually support a transmission rank greater than the recommended one. Both of these issues may well result in reduced throughput. On the other hand, if the SINR is overestimated, the link may not be able to support any recommended CQIs (including a recommended Modulation and Coding Scheme MCS) and transmission rank, resulting in excessive decoding errors and thereby reduced throughput also in this case.

However, the base station may monitor so-called "ACK/NACK signalling" from the terminal for received data blocks, and detect if a Block Error Rate BLER or the like is below or above a predetermined target value. From this information, the base station can decide to use a more offensive or defensive MCS than recommended by the terminal. However, if the base station selects a transmission rank different from the recommended one, the reported CQI will be largely irrelevant since, in most cases, it relates directly to the transmission rank. Consequently, the base station would not have a proper basis for selecting the MCS and other link parameters for the different data streams.

Figure 1:
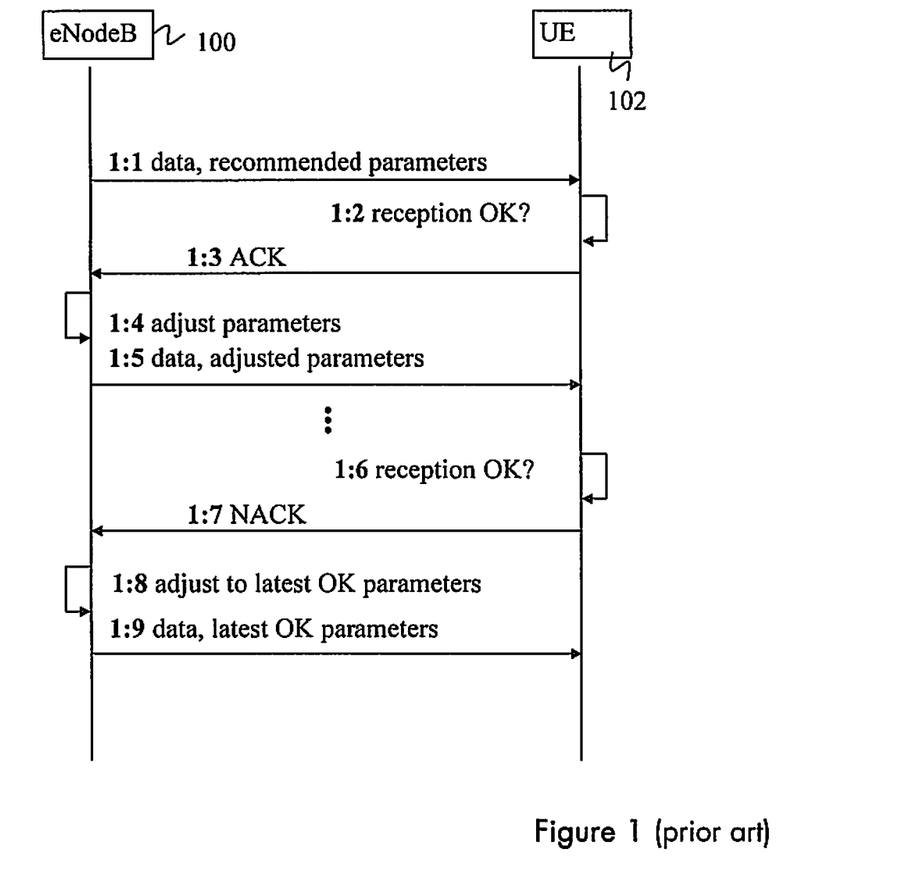
FIG. 1 is a signalling chart illustrating an outer loop adjustment according to prior art.

With reference to FIG. 1, an example of determining an estimate of the channel quality with so called outer-loop adjustment is described.

In a first step 1:1, data packets are transmitted by a base station, formatted according to a set of link parameters recommended by a communication terminal, e.g. in a link state report. The communication terminal determines whether the data packets are successfully received or not, in a subsequent step 1:2. In case of successful reception of the data packets, the communication terminal sends one or more ACKs in a following step 1:3, else it continues with step 1:7 below. In the following step 1:4 the base station adjusts at least one of the transmission parameters, and sends further data packets formatted according with the adjusted transmission parameters in the subsequent step 1:5. The steps 1:2 to 1:5 are repeated until the data packets are not successfully received. When the communication terminal determines that the data packets are not successfully received in the step 1:6, it sends one or more NACKs to the base station in the following step 1:7. In step 1:8, the base station changes then the transmission parameters to the latest ones being acknowledged, and proceeds transmit data packets in the following step 1:9. The sequence of steps 1:2-1:9 may then be repeated, in order to perform transmission of data packets formatted according to the set of transmission parameters representing the highest channel quality which achieves reliable transmission of data packets.

It is thus generally a problem that, in a communication with dynamic link adaptation, a signal sending entity may receive inaccurate link quality estimations and/or link parameter recommendations from a signal receiving entity, such that the used link parameters are not optimal or appropriate for the actual link used in the communication.

SUMMARY

It would be desirable to obtain relevant estimations of communication properties for data transfers. It is an object of the invention to address at least some of the issues outlined above. Further, it is an object of the invention to provide a mechanism for estimating the current channel quality fast and accurate. These objects may be met by a method and apparatus according to the attached independent claims.

According to one aspect, a method in a sending system entity is provided for adjusting a channel quality estimate (CQE) associated with a data transfer to a receiving system entity in a mobile communication network. In the method are one or more probing packets communicated between the sending system entity and the receiving system entity, where each probing packet is formatted according to a predefined combination of transmission parameters. In response, the receiving system entity may send feedback messages regarding the receptions of the probing packets indicated successful (acknowledgment (ACK)) or unsuccessful (negative acknowledgment (NACK)) reception, when communicating the probing packages. A Channel State Information (CSI) report is also received from the receiving system entity, and the sending system entity estimates the CQE based on the CSI report together with which probing packets have been successfully and/or unsuccessfully communicated. When adjusting the CQE, the feedback messages may be employed as indicators of which probing packets being communicated successfully/unsuccessfully. Furthermore, a Power Measurement Offset (PMO) value may be sent to the receiving system, based on which probing packets been successfully communicated, as a basis for updating the CSI report before being received from the receiving system entity. By based on probing, determining a PMO value to be sent and receiving an updated CSI report, the sending system entity may be enabled to adjust the transmission rank recommended by the receiving system as indicated in the CSI report. The probing packets may be formatted according to a predefined combination of transmission parameters, e.g. modulation scheme coding scheme, transmission rank, transmission power, antenna weights etc. Furthermore, the probing process may be conditionally executed, e.g. when no or few CSI reports have been received or when the received CSI reports are expected to be inaccurate.

According to a further aspect a sending system entity is provided for adjusting a CQE for a data transfer to a receiving system entity. The sending system entity comprises a probing unit, a communication unit, and a controller. The probing unit is adapted to control a probing process, by deciding when probing shall be performed, deciding content and a transmission format for one or more probing packets, and determining which probing packets being successfully communicated. Such a probing process may comprise: sending one or more probing packets to the receiving system entity, and receiving one or more feedback messages from the receiving system entity, the feedback messages indicating whether the probing packets are successfully or unsuccessfully received. The communication unit is adapted to communicate the probing packets between the sending system entity and the receiving system entity, and receive a CSI report from the receiving system entity. The controller is adapted to adjust the CQE, based on a combination of which probing packets that have been successfully and/or unsuccessfully communicated and the CSI report. Moreover, the controller may be adapted to form a Power Measurement Offset (PMO) value based on which probing packets being successfully and/or unsuccessfully received, to be sent to the receiving system entity. The probing packets which have been successfully/unsuccessfully communicated may be indicated by feedback messages corresponding to the probing packets. Furthermore, the sending system entity may be implemented as a radio base station, an access point, a NodeB, or an eNodeB.

The above methods and arrangements may be used to obtain an accurate estimate of the current channel quality. By sending a sequence of probing packets formatted with a combination of transmission parameters and not wait for each probing packet to be acknowledged before the next one is sent, a relevant and accurate estimate of the current channel quality may be determined faster and more accurately.

Further features and benefits of the present invention will become apparent from the detailed description.

BRIEF DESCRIPTION OF THE DRAWINGS

The invention is now described, by way of example, with reference to the accompanying drawings, in which.

DETAILED DESCRIPTION

Briefly described, a solution is provided for enabling more accurate and flexible estimation of the current channel quality for data transfers. A sending system entity comprises a probing unit which controls a probing process by determining that probing shall be performed, for which sending a sequence of probing packets formatted to represent various channel conditions to be evaluated. A receiving system entity comprises another probing unit, which determines whether the probing packets are successfully received or not, and informs the sending system entity of this through a feedback message (e.g. ACK/NACK) corresponding to each probing packet.

The PMO (Power Measurement Offset) may for LTE be exemplified by the parameter nomPDSCH-RS-EPRE-Offset, which also is known as $\Delta$offset.

The "Channel quality condition" is a general term describing at what bitrate data reliably can be transferred, i.e. the throughput of error-free data. A high channel quality enables the data to be transferred at a high bitrate, e.g. using multiple streams (i.e. high rank), a high order modulation and a high code rate.

Figure 2:
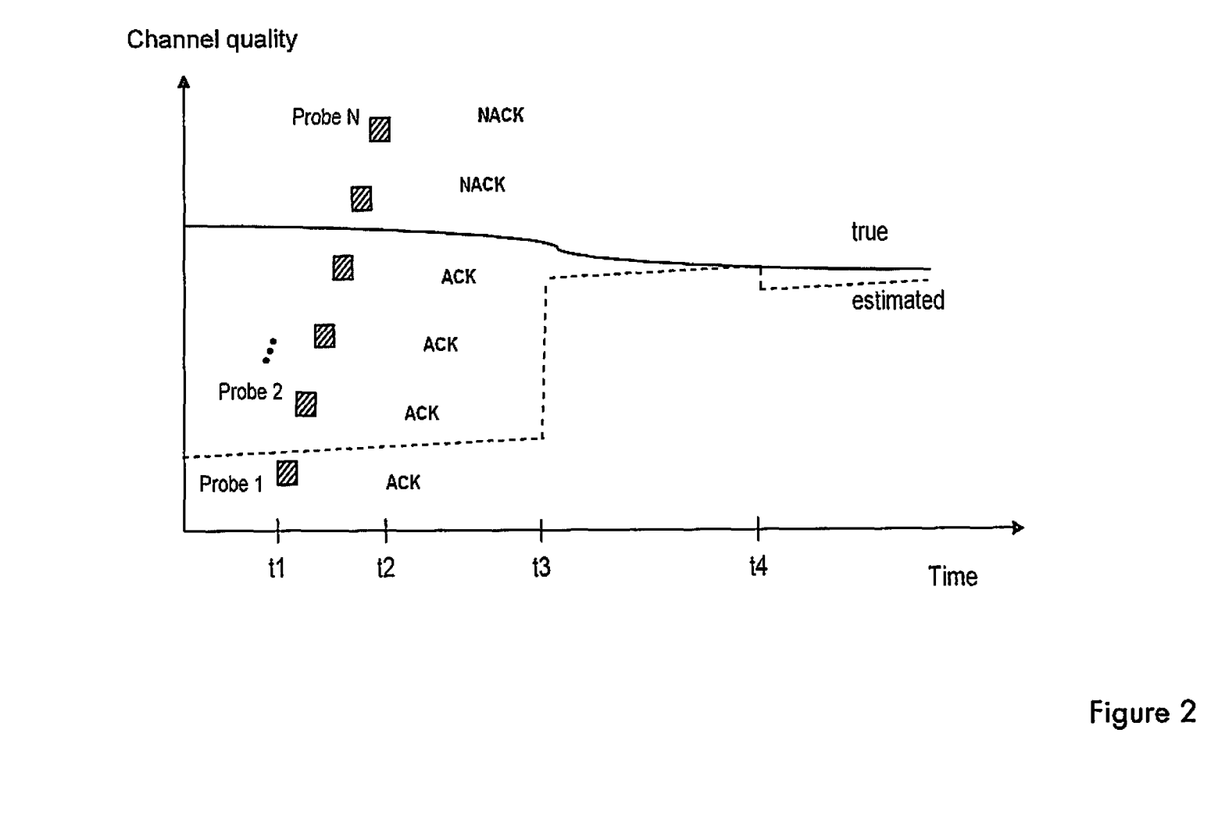
FIG. 2 is a diagram illustrating a probing process, according to an embodiment

With reference to FIG. 2, showing a diagram, an example of a probing process will now be described, in accordance with an embodiment.

The diagram shows the channel quality as a function of time for a communication channel between a sending system entity and a receiving system entity. The actual/true channel quality is illustrated with a continuous line. The channel quality estimated by the sending system entity, according to this embodiment illustrated with a dashed line, is partly obtained from CSI reports from the receiving system entity. In addition to using CSI feedback when determining the estimate, a sequence of probing packets (Probe 1, Probe 2, . . . , Probe N) is sent from the sending system entity to the receiving system entity at the time t1. Each probing packet is formatted with a combination of transmission parameters, and the sending system entity has decided for which combinations that it is relevant to perform the probing process. Typically, the sending system entity selects the transmission parameters of the probing packets in a sequence where the required channel quality condition increases with the order of the probing packets, but the transmission parameters could also be chosen such that the required channel quality condition decreases, or according to an arbitrary function describing the required channel quality condition. It is also to be noted that the value of each transmission parameter for the probing packets does not necessarily follow the function for the required channel quality condition. It is instead the combination of the parameter values which requires a certain channel quality condition.

When the first probing packet in the sequence is sent, the sending system entity sends the second probing packet, independently of whether the first probing packet has been acknowledged by the receiving system entity or not. Typically, a successful reception of a specific probing packet is acknowledged with an ACK and an unsuccessful with a NACK, according to HARQ (Hybrid Automatic Repeat ReQuest), by the receiving system entity. The sequence of ACK/NACKs, corresponding to the probing packets, begins to be received by the sending system entity at the time t2. At the time t3, when the sequence of ACK/NACKs is received, the sending system entity adjusts its channel quality estimate based on which ACKs being received, i.e. which probing packets have been successfully received by the receiving system entity. However, even if ACKs/NACKs are employed as feedback messages to acknowledge successful/unsuccessful reception of specific probing packets in this embodiment, it is to be noted that the acknowledgments may be implemented alternatively. For instance, either successful or unsuccessful receptions may be acknowledged. Furthermore, the acknowledgements may be co-ordinated, and a sent ACK may indicate successful reception of a set of probing packets, e.g. by using so called implicit ACK, within the inventive concept. When the adjustment of the channel quality estimate is made, the sending system may perform a new probing process to further adjust the channel quality estimate, if necessary, at the time point t4. The probing packets and the ACK/NACKs of the new probing process are not shown in the figure. Moreover, the sending system entity may repeat the probing process with suitable time intervals, or perform the probing process when decided necessary.

Figure 3:
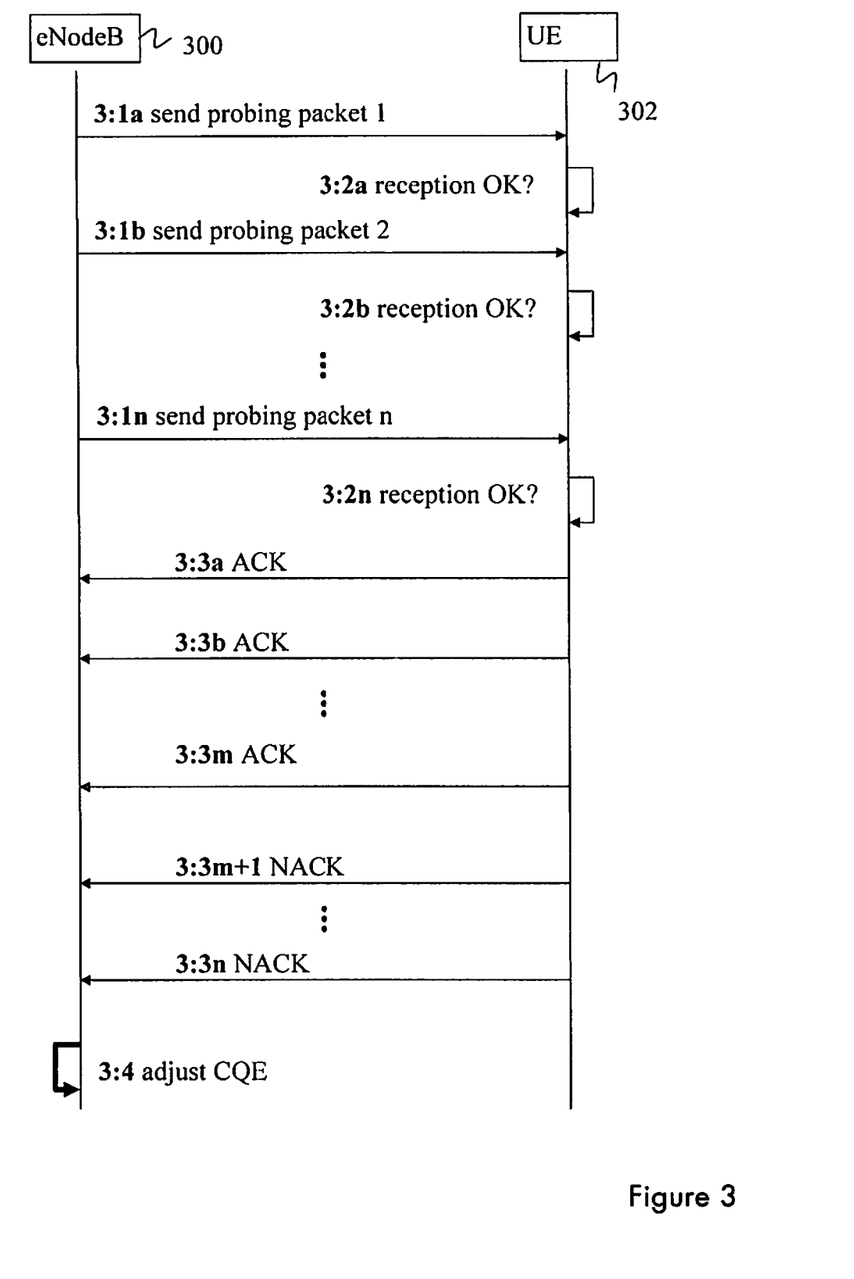
FIG. 3 is a signalling chart illustrating a probing process, according to another embodiment.

With reference to FIG. 3, showing a signalling chart, an example adjustment of a channel quality estimate in accordance with an embodiment will now be described.

As described in the embodiment above, in a first step 3:1a, 3:1b, ..., 3:1n a sending system entity 300 a sends a sequence of one or more probing packets to a receiving system entity 302. The receiving system entity determines if the probing packets are successfully received or not, in another step 3:2a, 3:2b, ... 3:2n. In yet another step 3:3a, 3:3b, ... 3:3m, 3:3 m+1, 3:3n feedback messages are sent to the sending system entity regarding the reception of the probing packets. For the successfully received probing packages ACKs are sent and for unsuccessfully NACKs. The described steps are typically performed in parallel, i.e. one step is not fully completed before the next step is initiated. For instance, all probing packets do not have to be received by the receiving system entity, before the sending of ACK/NACKs is started. However, for simplicity reasons, the feedback messages are illustrated to be sent after all probing packets have been sent. Furthermore, the feedback messages may be implemented differently, which will be described in another embodiment. In a final step 3:4, when the acknowledgements are received the sending system entity adjusts the CQE based on the statistics of the probing packet feedback messages, e.g. on which probing packets that have been being successfully received.

By performing a probing process, and sending a sequence of probing packets, formatted to represent a number of relevant quality conditions, without waiting for each packet to be acknowledged, a fast and reliable adjustment of the channel quality estimate is achieved. Furthermore, by selecting the probing packets to be sent and evaluate a plurality of transmission parameters in each probing packet, the time for providing a relevant channel quality estimate will further decreased.

Typically, a reliable channel quality estimate will be determined within some milliseconds, when performing probing. With a traditional outer loop solution, the corresponding estimate can take seconds to determine if the initial estimate is far from the actual channel quality.

Figure 4:
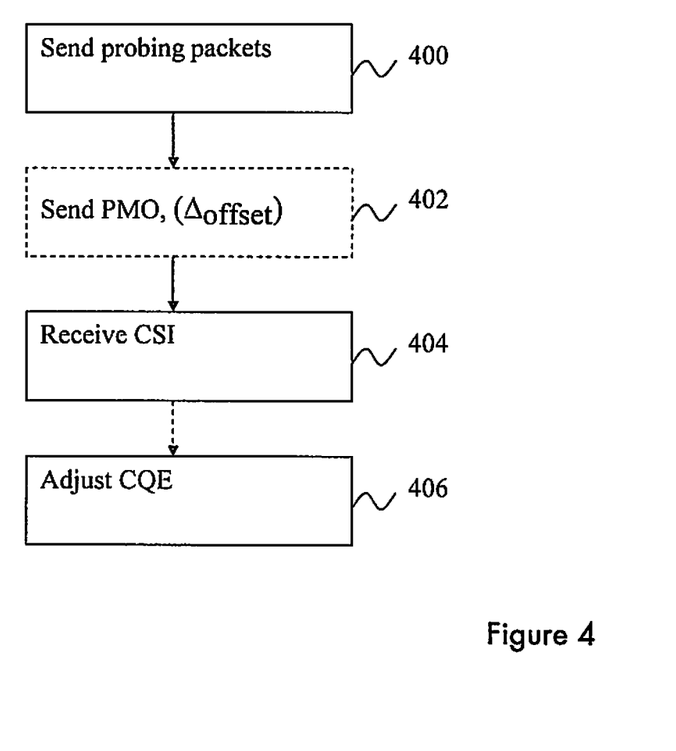
FIG. 4 shows a method in a sending system entity, according to a further embodiment.

With reference to FIG. 4, showing a flow chart, a method in a sending system entity for enabling adjustment of one or more transmission parameters for a data transfer between the sending system entity and a receiving system entity, based on the current channel quality condition, will now be described in accordance with an embodiment.

In a first step 400, one or more probing packets are sent from the sending system entity, and one or more feedback messages regarding the reception of the probing packets are received from the receiving system entity in response. Typically, the feedback messages are realised as ACK/NACKs, as described in an embodiment above.

The receiving system entity knows which transmission parameters a packet is formatted with, through the successful decoding of control signalling from the sending system entity. The probing packets are typically realised as regular data packets, in which the payload consists of regular user data, or alternatively of padding.

Each probing packet is formatted according to a combination of transmission parameters, which together will provide reliable communication in a specific channel quality condition. For instance, each probing packet will be formatted in accordance with one or more of: a predefined modulation scheme, coding rate, transmission rank, transmission power, transmit antenna weights, transmission bandwidth, transmission time, packet size, etc. The number of probing packets may vary, but will be selected to evaluate a reasonable number of relevant channel quality conditions.

In a following step 404, a Channel State Information, CSI, report is received from the receiving system entity. Communication of CSIs is known and will therefore not be further discussed. In a final step 406, the sending system entity adjusts a Channel Quality Estimate (CQE), based the statistics of the feedback messages, received from the receiving system entity, corresponding to the probing packets together with the CSI report. The sending system entity employs the received acknowledgements as indication of which probing packets being successfully received. The adjustment comprises both a determination of how the CQE shall be modified and the actual modification of the CQE according to the determination. In this embodiment the signal-to-interference-and-noise ratio (SINR) is applied for indicating the CQE. However, also other parameters may be applied when estimating the CQE, e.g. the channel rank, or a combination of various suitable parameters, within the inventive concept.

In an alternative embodiment, based on the above described one, the sending system entity sends a Power Measurement Offset (PMO) value, based on which probing packets being successfully received by the receiving system entity, in an intermediate step 402, executed after step 400 but before step 404. In this embodiment the CSI received in step 404 is adjusted by the receiving system entity, based on the PMO.

By introducing the additional intermediate step 402, and sending a PMO value to the receiving base station, the sending system entity is enabled to affect the adjustment of the CSI in the receiving system entity, which achieves a more accurate adjustment of the CQE. By sending the PMO value to be used as a basis for the adjustment of the CSI, facilitates/enables the sending system entity to adjust its CQE to another rank than the rank indicated in the original CSI report. Furthermore, designing a mechanism for adjusting the CQE on a combination of which acknowledgements being received and the adjusted CQE provides a flexible and reliable solution. However, even if the PMO value is employed in this embodiment, to enable the CSI report to be adjusted by the receiving system entity, any other suitable signalling parameter may be employed instead. For instance, a dB-value telling the receiving system entity to overestimate the sending power with the dB-value, or a single bit telling the receiving system entity to over-/underestimate which probing packets being successfully communicated.

Moreover, the probing process may alternatively be performed in advance, e.g. when evaluating the communication channel before a large quantity of information to be sent, e.g. in TCP slow start.

Figure 5:
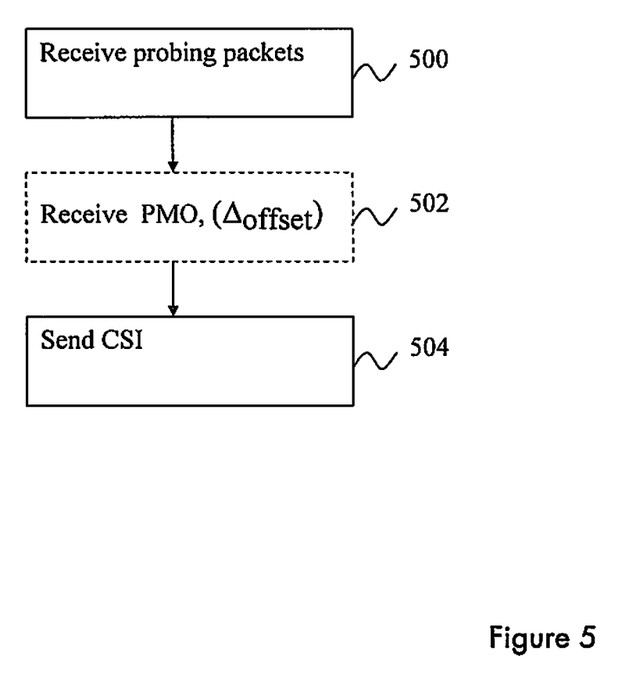
FIG. 5 shows a method in a receiving system entity, according to a further embodiment.

With reference to FIG. 5, showing a flow chart, a method in a receiving system entity for enabling adjustment of one or more transmission parameters in a sending system entity for a data transfer between the sending system entity and the receiving system entity, based on one current channel quality condition, will now be described in accordance with an embodiment.

In a first step 500, one or more probing packets are received from the sending system entity, and one or more feedback messages related to the reception of the probing packets are sent to the sending system entity in response. Typically, the feedback messages are realised as ACK/NACKs, as described in an embodiment above.

The format and content of the probing packets corresponds to the above described embodiment and is therefore not further described. In a final step 504, the receiving system entity reports a channel status by sending a Channel State Information (CSI) report to the sending system entity, to use as a basis for an adjustment of one or more transmission parameters.

In an alternative embodiment, based on the embodiment described above, a Power Measurement Offset (PMO) value is received from the sending system entity in an additional step 502, performed between the steps 500 and 504. The PMO value is based on which probing packets have been successfully received in step 500, and is sent by means of Radio Resource Control (RRC) signalling. In this embodiment, the receiving system entity uses the received PMO value as a basis for the adjustment of the CSI report in step 504, before sending the CSI report to the sending system entity. The adjusted CSI report enables the sending system entity to adjust its CQE based on the current channel quality condition. The function of the PMO and CSI is well-known to the skilled person and will therefore not be further discussed here.

Figure 6:
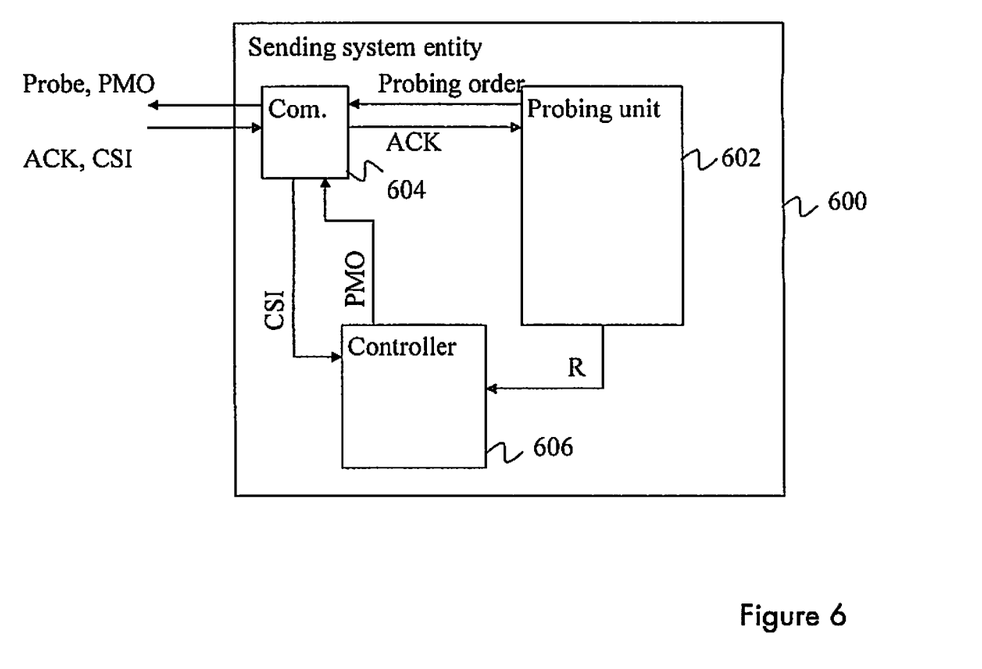
FIG. 6 shows a sending system entity, according to a further embodiment.

With reference to FIG. 6, showing a block diagram, a sending system entity 600 according to an embodiment will now be described. The sending system entity 600 comprises a probing unit 602, a communication unit 604, and a controller 606.

The probing unit 602 is adapted to control a probing process for estimating the current channel quality condition in a data transfer between the sending system entity and a receiving system entity, by deciding that probing shall be performed, deciding for which transmission formats the probing shall be performed, and evaluating the result of the performed probing. For instance, probing will typically be performed when no or few CSI reports have been received, or if CSI reports are suspected to be inaccurate, or before a large amount of data will be transmitted, or when no or few negative acknowledgements have been received, or during idle periods in the data transfer. As indicated in an embodiment above, each transmission format represents a specific channel quality condition. Typically, a wide range of transmission formats will be evaluated to estimate the current channel quality condition. The sending system entity according to the embodiment is adapted to send the probing packets in downlink.

To be able to control the probing process, the probing unit 602 is further adapted to order (indicated by probing order in the figure) the communication unit 604 to send the probing packets to the receiving system entity (indicated with probe in the figure) according to the decided transmission formats.

The communication unit 604 is adapted to send the probing packets to the receiving system entity, and is further adapted to receive acknowledgements (indicated with ACK in the figure) in response, and forward these to the probing unit 602. Moreover, the communication unit 604 is adapted to receive a CSI report from the receiving system entity, and forward to the controller 606. The normal operation of the communication unit 604 is to send data packets. At the point of probing, the probing unit 602 tells the communication unit 604 to transmit data/padding formatted according to a specific set of transmission parameters (probing format) instead of the transmission parameters suggested by link adaptation. The probing unit 602 is further adapted to receive these acknowledgements and determine the result of the probing process, e.g. which of the acknowledged probing packets that required the highest channel quality condition and was reliably communicated. Furthermore, the probing unit 602 is adapted to inform the controller 606 regarding the result (indicated with R in the figure) of the performed probing. The controller 606 is further adapted to apply the result of the probing and adjust a Channel Quality Estimate (CQE), based on the result of the probing process and the CSI report. The adjusted CQE may then be applied by the sending system entity 600, e.g. for link adaption, or scheduling. Furthermore, as described in an embodiment above, the acknowledgements may be realised alternatively within the inventive concept.

The format and content of the probing packets and the employment of them corresponds to the embodiment above, and is therefore not further discussed according to this embodiment.

In an alternative embodiment, based on the one above, the controller 606 is further adapted to set or adjust a Power Measurement Offset (PMO) value, based on the result of the performed probing and send the PMO value (indicated with PMO in the figure) to the receiving system entity, via the communication unit 604, to be used for updating the CSI report to be sent. In this embodiment, the controller 606 is further adapted to adjust the CQE based on the received updated CSI report. Consequently, according to this embodiment, the controller 606 is adapted to adjust the CQE based on a combination of the result of the probing and the adjusted CSI report, which achieves a flexible solution.

Furthermore, the skilled person is able to combine features from the embodiments above, e.g. by designing a sending system entity which may be employed both for sending probing packets in downlink to a receiving system entity, based on which probing packets which have been successfully communicated, and set/adjust a PMO value.

Figure 7:
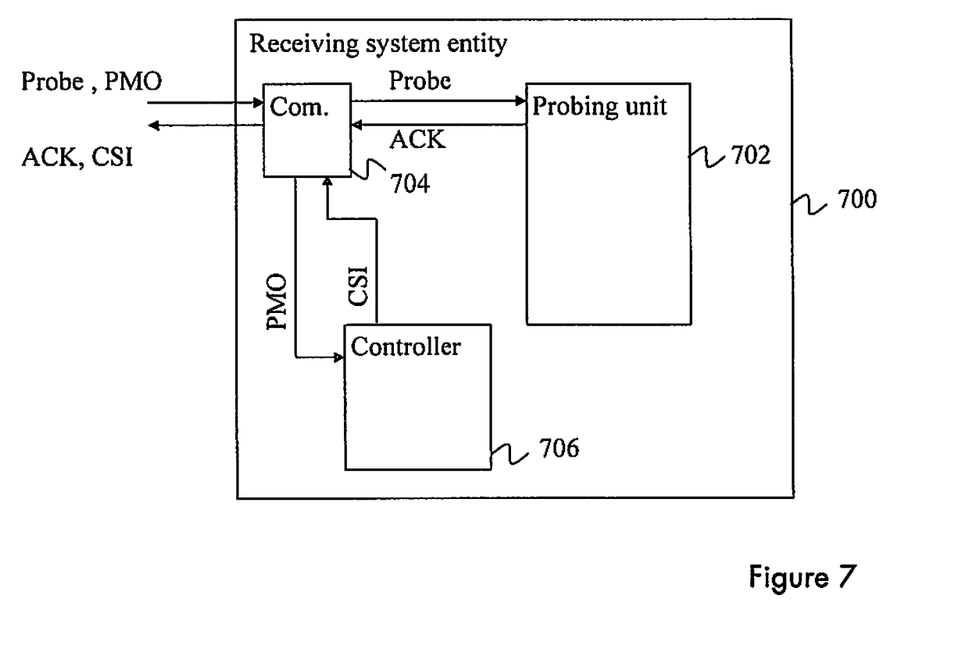
FIG. 7 shows a receiving system entity, according to a further embodiment.

With reference to FIG. 7, showing a block diagram, a receiving system entity 700 according to an embodiment will now be described. The receiving system entity 700 comprises a probing unit 702, and a communication unit 704.

The probing unit 702 is adapted to receive one or more probing packets (indicated with Probe in the figure) from a sending system entity via the communication unit 704, during a data transfer in downlink with the sending system entity. Furthermore, the probing unit 702 is adapted to confirm successfully received probing packets by sending acknowledgements (indicated with ACK in the figure), each acknowledgement representing successful reception of a specific probing packet. In this embodiment, the acknowledgements are realised as ACKs according to HARQ and the probing unit 702 is further adapted to send ACKs. The communication unit 704 is adapted to receive the probing packets from the sending system entity and to send the acknowledgements in response. The probing unit 702 may further be adapted to send negative acknowledgements, e.g. NACKs to the sending system entity, or combine ACK/NACKs, e.g. implicit ACK.

In an alternative embodiment, based on the one above, the receiving system entity 700 further comprises a controller 706, adapted to receive an adjusted Power Measurement Offset (PMO) value from the sending system entity, via the communication unit 702. The controller 706 is further adapted to adjust a CSI report based on the received adjusted PMO value. Moreover, the communication unit 704 is further adapted to receive the adjusted PMO value from the sending system entity and send the adjusted CSI to the sending system entity.

It is also to be noted that the features of the embodiments described above may be combined when designing a receiving system entity, within the inventive concept.

It should be noted that the FIGS. 6 and 7 merely illustrate various functional units in the sending system entity 600 and the receiving system entity 700, respectively, in a logical sense, although the skilled person is free to implement these functions in practice using any suitable software and hardware means. Thus, the invention is generally not limited to the shown structure of the sending system entity 600, and the receiving system entity 700, respectively, while their functional units may be configured to operate according to the methods and procedures described above for FIGS. 4 to 5, where appropriate. For instance, functionality placed in a specific functional unit may be placed in another suitable functional unit, where appropriate.

Furthermore, it is to be understood that the sending system entity 600 and the receiving system entity 700, respectively, described above in this description also comprises additional conventional means providing functionality, such as e.g. various control units and memories, necessary for enabling common functions and features to operate properly. However, for simplicity reasons, any means or functionality which is not necessary for the understanding of the proposed enabling of the probing process has been omitted in the figures, and will not be discussed in any further detail in this description.

While the invention has been described with reference to specific exemplary embodiments, the description is in general only intended to illustrate how the invention can be used and should not be taken as limiting the scope of the invention. Although the concepts of LTE and HSPA have been used throughout when describing the above embodiments, any other similar or equivalent standards and network elements for mobile communication may basically be used in the manner described. The invention is generally defined by the following independent claims.

Abbreviations
CSI Channel State Information
CQE Channel Quality Estimate
CQI Channel Quality Indicator
CRS Cell Reference Signal
LTE 3GPP Long Term Evolution
PMO Power Measurement Offset

The invention claimed is:

1. A method, in a sending system entity, for adjusting a channel quality estimate (CQE) associated with a data transfer to a receiving system entity in a mobile communication network, the method comprising:
   communicating one or more probing packets between the sending system entity and the receiving system entity, each probing packet being formatted according to a predefined combination of physical transmission parameters;
   sending a Power Measurement Offset (PMO) value to the receiving system, the PMO value determined based on which probing packets have been successfully and/or unsuccessfully communicated;
   receiving a Channel State Information (CSI) report from the receiving system entity, the CSI report:
   describing physical characteristics of a physical link between the sending system entity and the receiving system entity; and
   having been adjusted based on the PMO value by the receiving system entity;
   adjusting the CQE based on the CSI report and based on which probing packets have been successfully and/or unsuccessfully communicated.

2. The method of claim 1, wherein the communicating comprises:
   forming and sending the probing packets to the receiving system entity;
   receiving one or more feedback messages from the receiving system entity, each feedback message representing the successful and/or the unsuccessful reception of one or more of the probing packets by the receiving system entity.

3. The method of claim 2, wherein the feedback messages are:
   positive acknowledgements (ACKs) whenever the probing packets are successfully received;
   negative acknowledgements (NACKs) whenever the probing packets are unsuccessfully received; or
   a combination of ACKs and NACKs.

4. The method of claim 1, wherein the adjusting the CQE comprises determining how the CQE should be modified, and modifying the CQE accordingly.

5. The method of claim 1, wherein the probing packets are formatted according to at least one of:
   a predefined modulation scheme;
   a predefined code rate of forward error correcting codes;
   a predefined transmission rank;
   a predefined transmission antenna weight.

6. The method of claim 1, wherein the probing packets are sent with at least one of:
   a predefined transmission power;
   a predefined transmission bandwidth;
   a predefined transmission time;
   a predefined packet size.

7. The method of claim 1, wherein the probing packets comprise at least one of:
   user data;
   padding;
   a combination of user data and padding.

8. The method of claim 1, wherein the communicating, the adjusting, and the receiving are conditionally executed when at least one of the following conditions are fulfilled:
   no or few CSI reports have been received;
   a large amount of data will be transferred or is expected to be transferred;
   the received CSI reports are expected to be inaccurate;
   no or few negative feedback messages are received over a period of time;
   during idle periods in the data transfer.

9. The method of claim 1, wherein the sending system entity is as any of:
   a radio base station;
   a NodeB;
   an eNodeB;
   an access point;
   a relay station.

10. A sending system entity for adjusting a Channel Quality Estimate (CQE) for a data transfer to a receiving system entity, the sending system entity comprising:
   a processor and a memory, the memory containing instructions executable by the processor whereby the sending system entity is configured to: control a probing process by:
   deciding when probing shall be performed;
   deciding a content and a transmission format for one or more probing packets according to a predefined combination of physical transmission parameters;
   determining which probing packets have been successfully and/or unsuccessfully communicated;

communicate the probing packets between the sending system entity and the receiving system entity;

send a Power Management Offset (PMO) value to the receiving system, the PMO value determined based on which probing packets have been successfully communicated and which probing packets that have been unsuccessfully communicated;

receive a Channel State Information (CSI) report from the receiving system entity, the CSI report:

describing physical characteristics of a physical link between the sending system entity and the receiving system entity; and having been adjusted based on the PMO value by the receiving system entity;

adjust the CQE based on a combination of which probing packets have been successfully and/or unsuccessfully communicated and based on the CSI report.

11. The sending system entity of claim 10, wherein the probing process comprises:

sending one or more probing packets to the receiving system entity;

receiving one or more feedback messages from the receiving system entity;

wherein the feedback messages indicate whether the corresponding one or more probing packets are successfully and/or unsuccessfully received by the receiving system entity.

12. The sending system entity of claim 11, wherein the sending system entity is further configured to:

form the probing packets and receive one or more feedback messages;

send the probing packets to the receiving system entity;

receive the feedback messages from the receiving system entity;

employ the feedback messages as an indication of which probing packets have been successfully communicated and which probing packets that have been unsuccessfully communicated.

13. The sending system entity of claim 11, wherein the sending system entity is as any of:

a radio base station;
a NodeB;
an eNodeB;
an access point;
a relay station.

* * * * *